United States Patent
Lim et al.

(10) Patent No.: US 7,450,551 B2
(45) Date of Patent: Nov. 11, 2008

(54) MULTICAST TRANSMISSION METHOD IN GEM MODE IN GIGABIT-CAPABLE PASSIVE OPTICAL NETWORK AND METHOD OF PROCESSING FRAME

(75) Inventors: Se-Youn Lim, Seoul (KR); Jae-Yeon Song, Seongnam-si (KR); Jin-Hee Kim, Suwon-si (KR); Seo-Won Kwon, Suwon-si (KR); Yoon-Sun Lee, Seoul (KR); Jong-Hwa Lee, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 779 days.

(21) Appl. No.: 10/869,434

(22) Filed: Jun. 16, 2004

(65) Prior Publication Data

US 2005/0013314 A1     Jan. 20, 2005

(30) Foreign Application Priority Data

Jul. 14, 2003    (KR)   .................. 10-2003-0047917
Jul. 16, 2003    (KR)   .................. 10-2003-0048927
Nov. 28, 2003   (KR)   .................. 10-2003-0085532

(51) Int. Cl.
*H04Q 7/24*      (2006.01)
*H04L 12/28*    (2006.01)

(52) U.S. Cl. .................. 370/338; 370/389; 370/392; 398/99

(58) Field of Classification Search .................. None
See application file for complete search history.

(56) References Cited

U.S. PATENT DOCUMENTS

2002/0150097 A1 * 10/2002   Yen et al. .................... 370/390

(Continued)

FOREIGN PATENT DOCUMENTS

EP      1119120 A2    11/2000

(Continued)

OTHER PUBLICATIONS

Juhong, Wu et al.; "Application of IP Multicast in Remote Transmssion System of Heavy Date;" Computer Engineering, vol. 29, No. 5; Apr. 2003; 3 pgs.

(Continued)

*Primary Examiner*—Melanie Jagannathan
(74) *Attorney, Agent, or Firm*—Cha & Reiter, LLC (57) ABSTRACT

A multicast transmission method in GEM mode in Gigabit-capable passive optical network and a method of processing frames. The multicast transmission method includes the steps of: (a) setting a multicast connection; and (b) transmitting multicast messages in a GEM mode, wherein said step (a) includes a first sub step (i), in which predetermined ONTs are registered to a multicast group by means of IGMP frames in the first step, and a second sub step (11), in which an OLT assigns a multicast port ID to the multicast group and the ONTs registered to the multicast group. In addition, step (b) includes a first substep (i), in which the OLT assigns a multicast port ID to a message transmitted from a router to the multicast group, and transmits the message, and a second sub-step (ii), in which an ONT, which belongs to the OLT, filters the message, to which the multicast port ID is assigned, by means of a port ID assigned to the ONT.

5 Claims, 9 Drawing Sheets

U.S. PATENT DOCUMENTS

2003/0117998 A1    6/2003    Sala et al.
2003/0152389 A1*    8/2003    Sala et al. .................... 398/98
2004/0240466 A1*    12/2004    Unitt et al. ................. 370/461

FOREIGN PATENT DOCUMENTS

EP    1119134 A2    11/2000
JP    2004-343243    12/2004

OTHER PUBLICATIONS

"Top Level Specification of PTSP, TC and MAC Components;" Ing-Jyh Tsang et al.; GigaPON Access Network; XP002288126; Mar. 12, 2003; 38 pgs.

* cited by examiner

MULTICAST TRANSMISSION METHOD IN GEM MODE IN GIGABIT-CAPABLE PASSIVE OPTICAL NETWORK AND METHOD OF PROCESSING FRAME

CLAIM OF PRIORITY

This application claims priority to an application entitled "Multicast transmission method in GEM mode in Gigabit-capable passive optical network and method of processing frame," filed in the Korean Intellectual Property Office on Jul. 14, 2003 and assigned Serial No. 2003-47917 and Jul. 16, 2003 and assigned Serial No. 2003-48927 and Nov. 28, 2003 and assigned Serial No. 2003-85532, the contents of which are hereby incorporated by reference.

BACKGROUND OF THE INVENTION

1. Field of the Invention

The present invention relates to a Gigabit-capable passive optical network (hereinafter, referred to as GPON). More particularly, the present invention relates to a multicast transmission method using GEM (GPON Encapsulation Method) Mode.

2. Description of the Related Art

In order to construct a subscriber network from a telephone office to a building or a general house, there are various network structures and progress schemes that have been recently proposed. For instance, an x-digital subscriber line (XDSL), a hybrid fiber coax (HFC), a fiber to the building (FTTB), a fiber to the curb (FTTC), or a fiber to the home (FTTH) all have been proposed in recent years. From among these structures, an FTTx (x represents B, C, or H) structure may be classified into an active FTTx structure that is realized by construction of an active optical network (hereinafter, referred to as AON), and a passive FTTx structure which is realized by construction of a passive optical network (hereinafter, referred to as a PON).

Herein, since a PON, which is employed for realizing a passive FTTx, has a point-to-multipoint topology by passive elements, it is proposed that a PON be selected as a scheme of choice for realizing an economic subscriber network. In other words, in the PON, one optical line termination (hereinafter, referred to as an OLT) is connected to a plurality of optical network units (hereinafter, referred to as ONUs) by means of an optical distribution network (hereinafter, referred to as an ODN) of 1×N. This connection to a plurality of optical networks utilizes a distributed topology with a tree structure that is formed.

Figure 1:
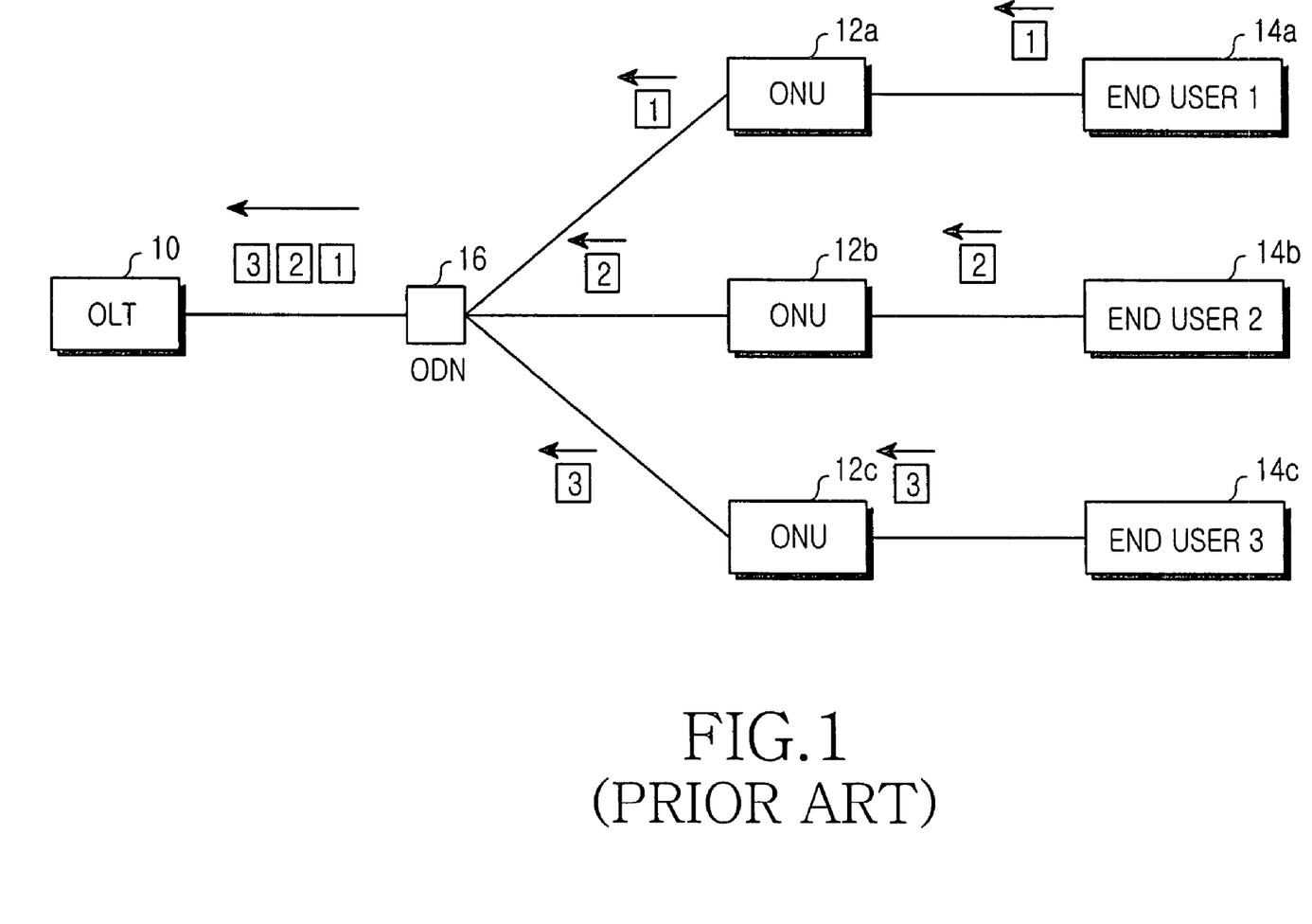
FIG. 1 is a block diagram of a conventional PON.

FIG. 1 is a block diagram of a conventional PON. Generally, a PON includes one OLT and a plurality of ONUs. FIG. 1 shows an example in which one OLT 10 is connected to three ONUs 12a to 12c through an optical distribution network ODN 16.

A first type of PON developed and standardized was an a synchronous transfer mode passive optical network (hereinafter, referred to as an ATM-PON), and the standardization contents are written in the ITU-T G.982, ITU-T G.983.1 and ITU-T G.983.3 series that are drawn up by the international telecommunication union's telecommunication section (ITU-T).

Figure 2:
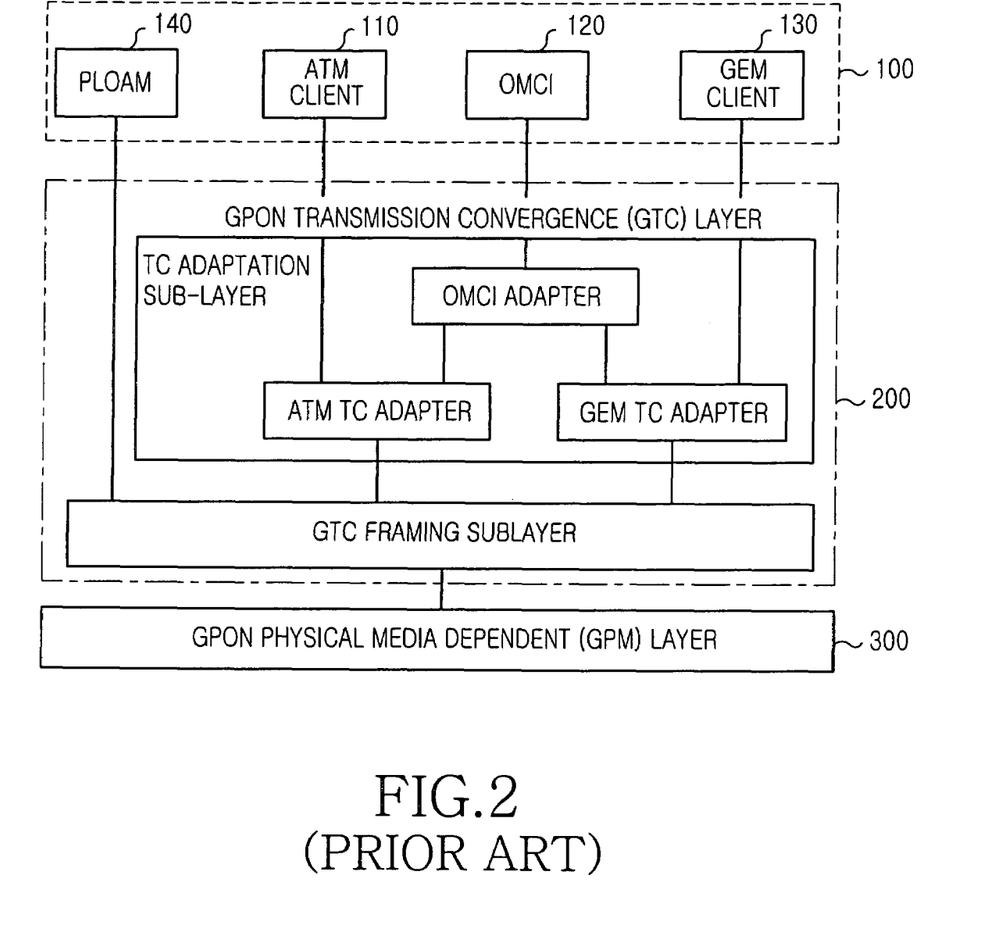
FIG. 2 illustrates a protocol stack structure of a conventional GPON.

FIG. 2 illustrates a protocol stack structure of a conventional GPON. Referring to FIG. 2, the protocol stack of the GPON includes a protocol layer 100 which interfaces with an upper layer, a GTC layer 200, and a GPON physical media dependent (GPM) layer 300. The protocol layer 100 comprises an ATM client 110, an ONT management control interface (hereinafter, referred to as an OMCI) 120, a GEM client 130, and a physical layer operation administration maintenance (PLOAM) module 140.

The OMCI has been drafted into the Ggpon.omci and its contents have been published, which is a protocol for controlling an ONU. The OMCI is classified into an ATM mode OMCI and a GEM mode OMCI. The ATM mode OMCI is based on definition of G.983.2 and the GEM mode OMCI is proposed for utilization of a GEM frame header and a payload structure used in an ATM mode. Herein, the main contents of the OMCI message includes a service setting and an assignment of a virtual path identifier (VPI)/a virtual channel identifier (VCI), or a setting for a data path assigning port IDs, etc.

In the GPON protocol having this structure, the GTC layer 200 converts upper frames into a GTC frame and subsequently transmits the frame. From among the upper frames, the ATM client 110 supports a transmission method of an ATM mode, and the GEM client 130 supports a transmission method of an GEM mode.

The ATM client 110 fits the transmission data to the GTC frame by the unit of a cell having a fixed length. In this case, if there is a portion that has a length shorter than the length of a cell (typically, 53 bytes) in the GTC frame, the ATM client 110 maps transmission data to the next frame and then transmits the frame. Accordingly, cells are not divided in the ATM mode.

However, since a GEM frame is a packet having a varied length, when the GEM client 130 shows that the packet fits the GEM frame to the GTC frame, the GEM client 130 may divide the GEM frame and then transmit the divided portions of the frame, to increase the efficient use of available bandwidths.

For instance, when the GEM client 130 receives user data from an upper layer, the GEM client 130 receives information (e.g. length) about the GTC frame, which is standing by, from the GTC layer 200, and divides the user data on the basis of the information (e.g. length), and generates a plurality of GEM frames. Otherwise, the GEM client 130 does not divide the user data, generates only one GEM frame, and then transmits the GEM frame to the GTC layer 200. Then, the GTC layer 200 fits the GEM frame to a GTC frame that is standing by, and transmits the frame. Also, a reception side reassembles the divided GEM frame and then transmits the frame to an upper layer.

In addition, a data transmission method in a network includes a unicast transmission method for one-to-one transmission; a broadcast transmission method for transmission of one-to-all nodes; a multicast transmission method for transmission of one-to-predetermined multiple nodes for multiple subscribers. Generally, the unicast transmission method and the broadcast transmission method are basically provided. However, in the case of the multicast transmission method, protocols for the multicast transmission and support in a corresponding network are necessary.

Figure 3:
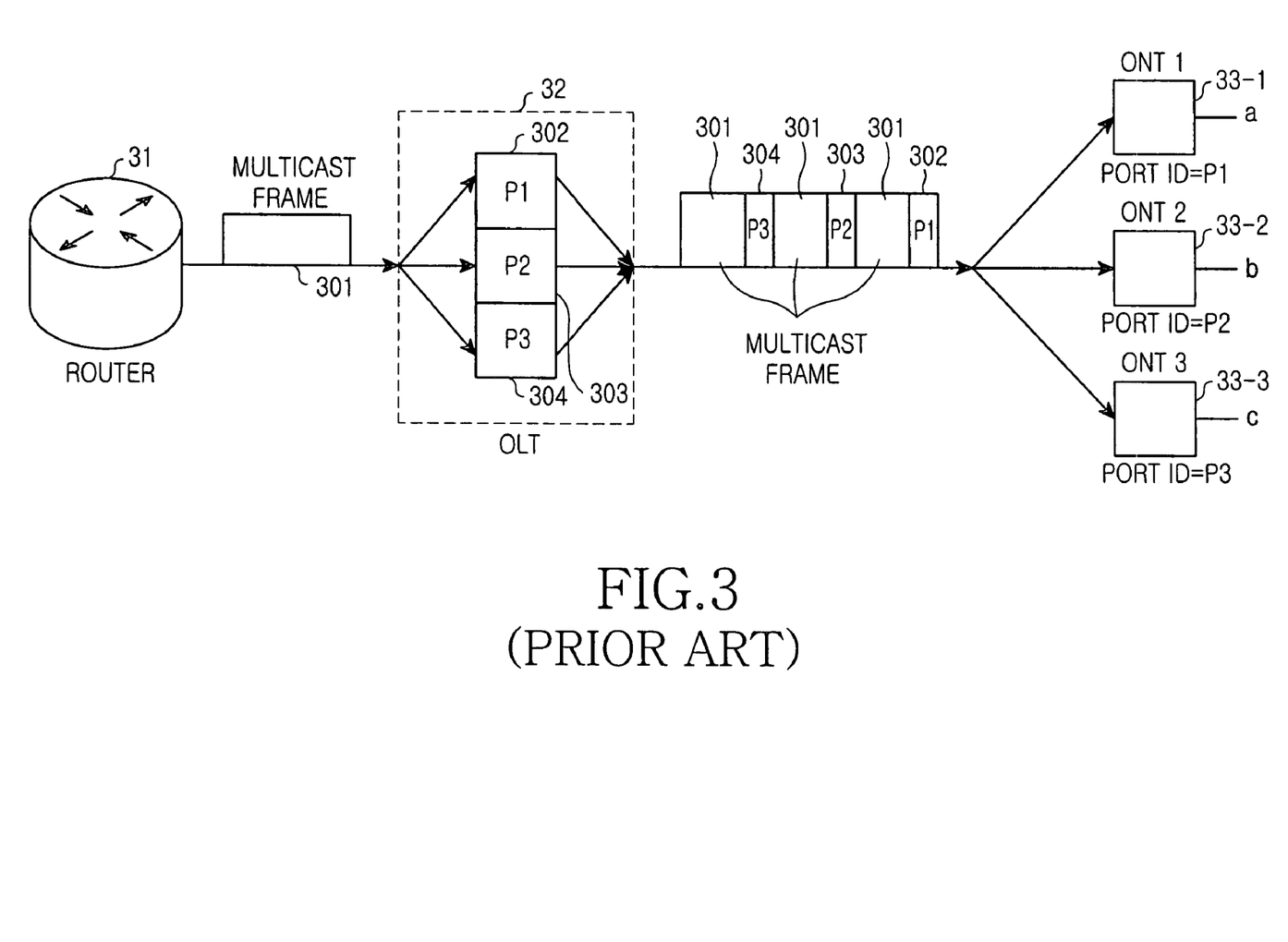
FIG. 3 is a view illustrating a layout of a router, multicast frame, OLT, and ONT used by a method for transmitting multicast frames in a GEM mode in a conventional GPON.

FIG. 3 shows a process of transmitting multicast frames in an GEM mode in an existing (a current) conventional GPON. Referring to FIG. 3, it is first assumed that members of a multicast group M registered in a router 31 are hosts a, b and c. When a multicast frame generated from the construction of FIG. 3 is transmitted to each multicast member host through a GEM mode of the GPON (which does not support a multicast), the GPON operates as follows:

For an Ethernet service in the GPON, in the GEM mode, one or more ports are assigned between an OLT 32 and an ONTs (or ONUs), and the ports are differentiated from each other by port IDs, such as P1, P2 and P3 shown in the FIG. 3.

The OLT 32 must determine ports through which a received multicast frame will be transmitted. From the result of the determination, port IDs P1, P2, P3 are recognized as registered ports registered of a multicast group. As a result, the multicast frame is transmitted through the recognized ports.

Specifically, a multicast frame 301 transmitted from the router 31 is transmitted to the OLT 32 with respect to ONTs which have been already registered to the router 31, which supports a multicast transmission method, as a members of a multicast group by means of an IGMP packet. Furthermore, the OLT 32 generates a multicast frame according to each of the ONTs by means of port IDs of the ONTs registered as the members of the multicast group, and then transmits the frame.

Herein, an operation of the OLT 32 will be described with reference to FIG. 3. The OLT 32 transmits a received multicast frame to ONTs 33-1 to 33-3, which are registered as the members of the multicast group, by means of port IDs P1, P2, P3 of each ONT. That is, the OLT 32 adds the received multicast frame to each of port IDs 302 to 304 corresponding to the ONTs 33-1 to 33-3, transmits the multicast frames, and each of the ONTs receives a packet corresponding to its own port ID. Accordingly, the OLT can perform corresponding multicast transmission with respect to the ONTs registered as the members of the multicast group.

As described above, the existing multicast transmission method according to a GEM mode of a GPON does not make the best use of the advantages realized by multicast transmission, and it has been processed by a way similar to a gathering of a plurality of unicast transmission.

As a result, the number of frames actually transmitted through the GPON is three times, as shown in FIG. 3 (this results from an example in FIG. 3, and it is apparent that the number of frames varies according to the number of ONTs belonging to the multicast group). This causes the same frame to be transmitted three times, and a majority of bandwidth is thus wasted.

As described above, since a multicast transmission method is not supported in the GEM mode of the conventional GPON, a multicast frame must be copied as many as the number of members of the multicast group and transmitted, and bandwidth is thus wasted.

SUMMARY OF THE INVENTION

Accordingly, the present invention has been made in part to solve at least some of the above-mentioned problems occurring in the prior art. An aspect of the present invention is to provide a multicast transmission method in a GEM mode in a Gigabit-capable passive optical network and multicast frame processing method that enables multicast transmission to be performed in the GEM mode in the Gigabit-capable passive optical network.

A GPON according to the present invention supports the unicast transmission method and the broadcast transmission method. Here, an ATM mode supports multicast transmission in such a method as that used in an ATM-PON, but a GEM mode has not presented a method yet, which can support the multicast transmission.

In order to accomplish the aforementioned objects, according to an aspect of the present invention, there is provided a multicast transmission method in a GEM mode in a Gigabit-capable passive optical network comprising: (a) setting a multicast connection; and (b) transmitting multicast messages in a GEM mode, wherein said step (a) includes a first step, in which predetermined ONTs are registered to a multicast group by means of IGMP frames in the first step, and a second step, in which an OLT assigns a multicast port ID to the multicast group and the ONTs registered to the multicast group, and wherein said step (b) includes a third step, in which the OLT assigns a multicast port ID to a message transmitted from a router to the multicast group, and transmits the message, and a fourth step, in which an ONT, which belongs to the OLT, filters the message, to which the multicast port ID is assigned, by means of a port ID assigned to the ONT.

In order to accomplish the aforementioned objects, according to another aspect of the present invention, there is provided a method of processing frames by an OLT for multicast transmission in a GEM mode in a Gigabit-capable passive optical network, the method comprising the steps of: a) an OLT receiving a frame from an ONT, which belongs to the OLT, and intercepting an IGMP frame by means of a MAC address of the received frame; b) confirming whether or not an address of a multicast group, which is included in the IGMP frame, is an address registered to the OLT; c) as a result of the confirmation in step b, when the address of the multicast group is the address registered to the OLT, confirming whether or not an ONT number coincides with an ONT number registered to the OLT; d) as a result of the confirmation in step b, when the address of the multicast group is not the address registered to the OLT, assigning a new multicast port ID to the address of the multicast group, and registering corresponding information to the OLT; e) as a result of the confirmation in step c, when the ONT number does not coincide with an ONT number registered to the OLT, assigning a multicast port ID, which has been registered to the address of the multicast group, to the ONT, and registering corresponding information to the OLT; and f) transmitting a message to the ONT, the message requiring the multicast port ID having been registered through step 4 or step 5 to be assigned to the ONT.

In order to accomplish the aforementioned objects, according to an embodiment of the present, there is provided a multicast transmission method in a GEM mode in a Gigabit-capable passive optical network, the multicast transmission method comprising the steps of: (a) setting a multicast connection; and (b) transmitting multicast messages in a GEM mode, wherein said step (a) includes a first step, in which predetermined ONTs are registered to a multicast group by means of IGMP frames in the first step, and a second step, in which an OLT assigns a multicast port ID to the multicast group and the ONTs registered to the multicast group through an OMCI message, and wherein said step (b) includes a third step, in which the OLT assigns a multicast port ID to a message transmitted from a router to the multicast group, and transmits the message, and a fourth step, in which an ONT, which belongs to the OLT, filters the message, to which the multicast port ID is assigned, by means of a port ID assigned to the ONT.

A GPON according to the present invention simultaneously supports not only a cell-based transmission method (that is, ATM mode) processing an ATM service, but also a GPON encapsulation method (that is, a GEM mode) processing packets having varied length, similarly to a time division multiplex (TDM) and an Ethernet service, differently from a broadband passive optical network (BPON) which is based on the G.983 series standardized as described above and operates on the basis of an ATM. Herein, in the ATM mode, transmission data is fitted to a GTC frame by the unit of a cell to be transmitted. Further, in the GEM mode, transmission data is fitted to a GTC frame by the unit of each GEM frame to be transmitted. Accordingly, an operation of the ATM mode is being standardized on the basis of an operation of the ITU-T I.160 ATM or the ITU-T G.983.1 ATM PON. However, in the case of the GEM mode, a detailed standardization supported by a GPON is being developed.

BRIEF DESCRIPTION OF THE DRAWINGS

The above and other objects, features and advantages of the present invention will become more apparent from the following detailed description taken in conjunction with the accompanying drawings, in which.

DETAILED DESCRIPTION OF THE INVENTION

Hereinafter, the present invention will be described with reference to the accompanying drawings. In the following description of the present invention, a detailed description of known functions and configurations incorporated herein will be omitted when it may obscure the subject matter of the present invention. In a description of the present invention, an ONU represents network terminating equipment that is considered equal to an ONT. In other words, in the following description of the present invention, it is clear that the ONU is network terminating equipment equal to the ONT even though the ONU is used together with the ONT.

The present invention utilizes multicast management information of a layer 3 in a GEM mode so that multicast transmission can be performed in the GEM mode in a GPON. Accordingly, an IGMP packet transmitting multicast information at the layer 3 is intercepted at the GEM mode, so that the information can be shared. Further, port IDs are generally assigned according to ONTs (ONUs). In contrast, in the present invention, port IDs are assigned according to multicast groups in order to support a multicast. Next, multicast port IDs are assigned to the multicast groups, and ONTs stores each of corresponding port IDs and the multicast port IDs of the multicast groups in which each of the ONTs is joined. Then, port IDs of transmitted packets are compared with the stored port IDs (including the port IDs assigned to the ONTs and the multicast port IDs of the multicast groups in which each of the ONTs is joined). From the result of the comparison, when the two ports are coincided with each other, a corresponding packet is accepted. In contrast, when the two ports are not coincided with each other, a corresponding packet is discarded.

A method for processing multicast frames in a GEM mode in a GPON according to the present invention will be in detail described with reference to FIGS. 4 to 6.

Figure 4:
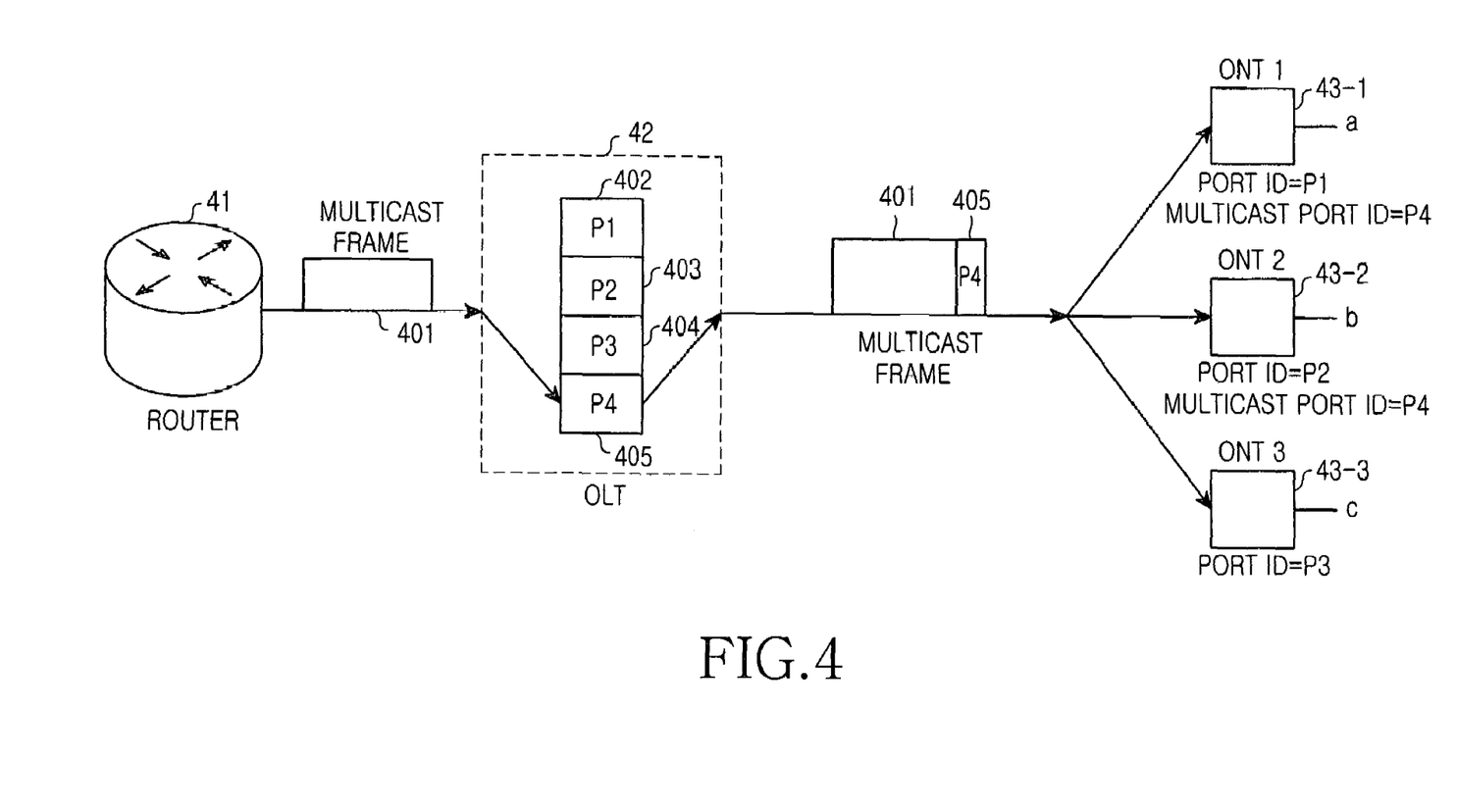
FIG. 4 is a view illustrating a method for processing multicast frames in a GEM mode in a GPON according to the present invention.

FIG. 4 is a view illustrating a method for processing multicast frames in a GEM mode in a GPON according to the present invention.

Referring to FIG. 4, first, it is assumed that members of a multicast group M registered in a router 41 are hosts a and b. When a multicast frame generated from the construction of FIG. 4 is transmitted to each of multicast member hosts a and b through the GEM mode of the GPON according to the present invention, an operation in the GPON will be described.

For an Ethernet service in the GPON, in the GEM mode, one or more ports are assigned between an OLT 42 and an ONTs (or ONUs), and the ports are differentiated from each other by port IDs. The OLT 42 shown in FIG. 4 determines ports through which a received multicast frame will be transmitted. In the present invention, multicast port IDs are assigned to multicast groups, multicast packets using corresponding multicast port IDs are generated with respect to multicast frames. Subsequently, the generated packets are transmitted.

In other words, not only port IDs P1 to P3 of ONTs 43-1 to 43-3, which belong to the OLT, but also multicast port ID P4 of a registered multicast group are assigned to the OLT 42 according to the present invention shown in FIG. 4. Accordingly, the OLT 42 stores information about the IDs. Thereinafter, when the OLT 42 receives multicast frames, it assigns corresponding multicast port IDs and transmits the frames.

As described above, when the OLT 42 transmits a multicast packet 405+401 by means of the multicast port ID P4 (405), the ONT 1(43-1) and the ONT 2 (43-2) accept the transmitted multicast packet 405+401 because they have not only their own IDs P1 (402) and P2 (403), but also the multicast port ID P4 (405). In contrast, since the ONT 3 (43-3) is not a host registered in the multicast group and thus does not have the multicast port ID P4 (405), the transmitted multicast packet 405+401 is not accepted in the ONT 3 (43-3). That is, since the port ID of the transmitted multicast packet 405+401 does not coincide with the port ID of the ONT 3 (43-3), the transmitted multicast packet 405+401 is not accepted in the ONT 3 (43-3).

According to the present invention, for the aforementioned operation to take place, the OLT 42 must understand not only whether the ONTs 43-1 to 43-3 have been registered to a multicast group or not, but also a multicast group to which the ONTs 43-1 to 43-3 have been registered and a multicast port ID information according to the multicast group.

Figure 5:
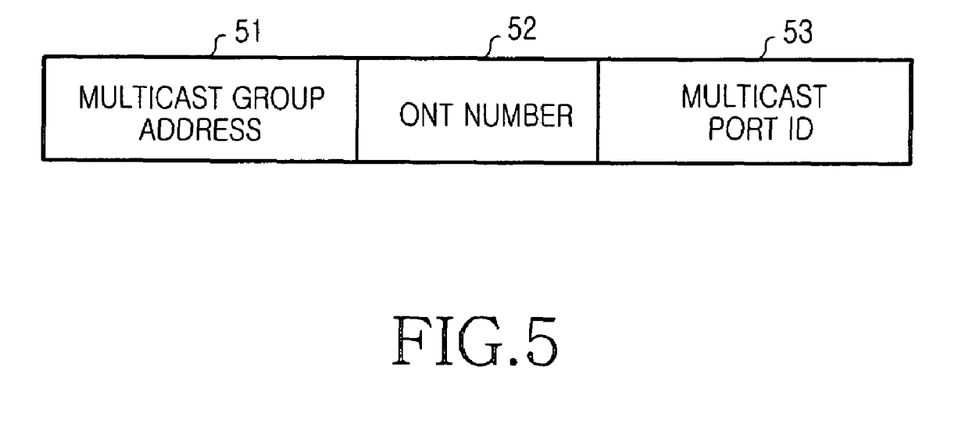
FIG. 5 is a view showing a management information base (MIB) stored in an OLT according to the present invention.
Figure 6:
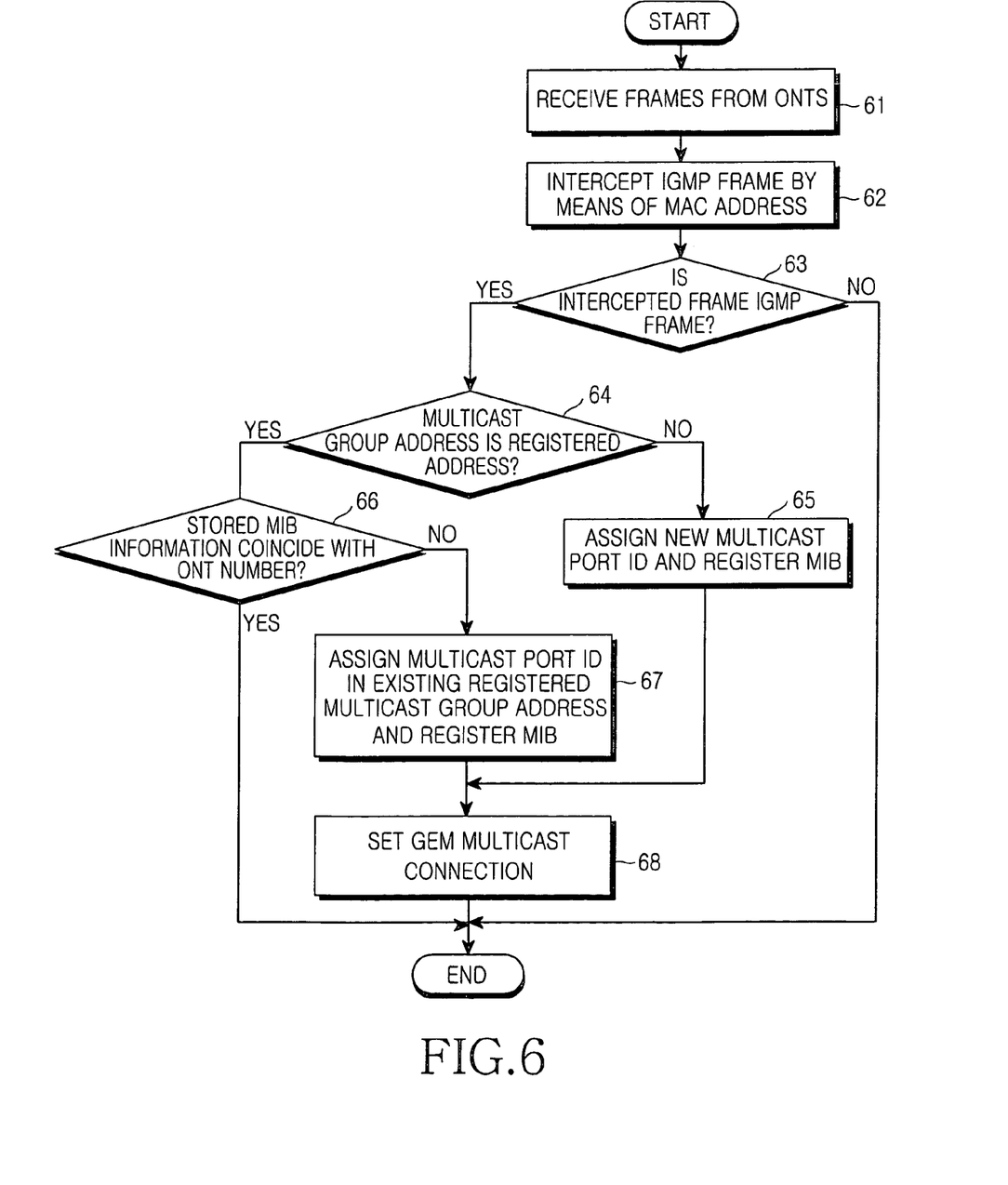
FIG. 6 is a flowchart illustrating a frame processing method for multicast transmission in an OLT of a GPON according to an aspect of the present invention.

In order to process the aforementioned information, the OLT generally requires an operation as shown in FIGS. 5 to 6.

FIG. 5 illustrates an MIB stored in an OLT according to the present invention, and FIG. 6 is a flowchart illustrating a frame processing method for multicast transmission in an OLT of a GPON according to an embodiment of the present invention.

Referring to FIG. 5, the OLT according to the present invention stores information about multicast groups in a management information base (hereinafter, referred to as an MIB) that is a database of information for management objects. As shown in FIG. 5, the stored information includes a multicast group address 51 which enables multicast groups to be differentiated, an ONT number 52 which represents an ONT which is registered to a multicast group, and a multicast port ID 53 of a corresponding multicast group.

Next, the flowchart shown in FIG. 6 will be described with reference to FIGS. 4 to 5.

Initially, in order to construct a multicast network, the hosts in the network must be registered to a router that supports a multicast group. For this registration, the ONT 1 (43-1) and the ONT 2 (43-2), which are hosts, transmits an IGMP frame, which is needed to be registered to a multicast group, to the router 41.

Furthermore, at step 61, the OLT 42 receives frames from the ONTs 43-1 to 43-3 and at step 62 intercepts the IGMP frame through a detection using MAC addresses of the received frames (step 62). Herein, the intercepted IGMP frame is found by checking all the frames, a media access control (MAC) address of which starts from "0x01005e". Herein, the value of "0x01005e" is a value for the IGMP frame presented by the Ethernet standard, and the GPON according to the present invention, may have another address value different from the value of "0x01005e" without affecting the scope of the present invention.

At step 63, the OLT 42 confirms again whether or not the intercepted frame is the IGMP frame. From the result of the confirmation, when the intercepted frame is not the IGMP frame, a frame processing course for multicast transmission ends. In contrast, when the intercepted frame is the IGMP frame, the OLT 42 confirms at step 64 whether or not a multicast group address included in the IGMP frame is an address that has been already registered to an MIB in the OLT 42.

From the result of the confirmation in step S64, when the multicast group address is not the registered address, at step 65 the OLT 42 assigns a new multicast port ID and registers a new MIB information as shown in FIG. 5.

However, from the result of the confirmation in step 64, when the multicast group address is the registered address, at step 66 the OLT 42 confirms whether or not the stored MIB information coincides with the ONT number 52 transmitting the IGMP frame.

From the result of the confirmation in step 66, when the stored MIB information coincides with the ONT number 52, the frame processing course for the multicast transmission ends.

In contrast, at step 67, when the stored MIB information does not coincide with the ONT number 52, the OLT 42 assigns the existing registered multicast port ID 53 included in the stored MIB information and registers new MIB information including a new ONT number 52.

Furthermore, at step 68, according to a registration of new MIB information as shown in step 65 or step 67, the OLT 42 transmits a message, which assigns a new multicast port ID 53, to a corresponding ONT, and then sets a GEM multicast connection.

Referring to FIG. 4, in order to register to a multicast group MG1, a host 'a', in other words, the ONT 1 transmits an IGMP frame to the router 41. Additionally, the OLT 42 intercepts the IGMP frame and compares an address of the multicast group MG1 included in the IGMP frame with a stored MIB (an address of a multicast group, an ONT number, and a multicast port ID).

Since the host 'a' has not been registered to the multicast group, the OLT 42 newly registers it. Further, the OLT 42 assigns a new multicast port ID as a P4 (405), and registers it to an MIB (MG1, ONT 1, and P4). Then, the OLT 42 transmits a message, which assigns a newly assigned multicast port ID 53, to the ONT 1 (43-1), and then performs a GEM multicast setting process.

Also, a host 'b', that is, the ONT 2, also transmits an IGMP frame to the router 41 in order to register to a multicast group MG1. Then, the OLT 42 intercepts the IGMP frame; reads information included in the IGMP frame, and compares the information with the stored MIB. Herein, since the multicast port ID P4 (405) has been already registered to the ONT 1 (43-1) with respect to the multicast group MG1, the same multicast port ID P4 (405) is assigned with respect to the ONT 2 (43-2), and new MIB information (MG1, ONT 2, and P4) is additionally registered. Further, the OLT 42 transmits a message, which assigns a newly assigned multicast port ID, to the ONT 2 (43-2), and then performs a GEM multicast setting process.

Moreover, when a multicast frame 401 corresponding to the multicast group MG1 is transmitted from the router 41, the OLT 42 assigns the multicast port ID P4 (405) to the multicast frame 401 according to MIB information, and transmits the frame to the ONTs 43-1 to 43-3.

Subsequently, each of the ONTs filters GEM frames, which are received from the OLT 42, by means of multicast port IDs assigned through the GEM multicast setting process. In other words, FIG. 4 shows that the ONT 1(43-1) and the ONT 2 (43-2) accept frames transmitted by means of the multicast port ID 405 and then transmit the accepted frames. In contrast, since the multicast port ID 405 has not assigned to the ONT 3 (43-3), the ONT 3 (43-3) filters the frames and then discards the frames.

Previously, multicast frames transmitted to hosts registered to a multicast group in such a way as described above, which is that they were transmitted to corresponding unicast ports, after as many multicast frames as the number of the ports are copied by the OLT. However, the multicast frames can be transmitted only once by means of multicast port IDs assigned to multicast groups in the present invention.

Figure 7:
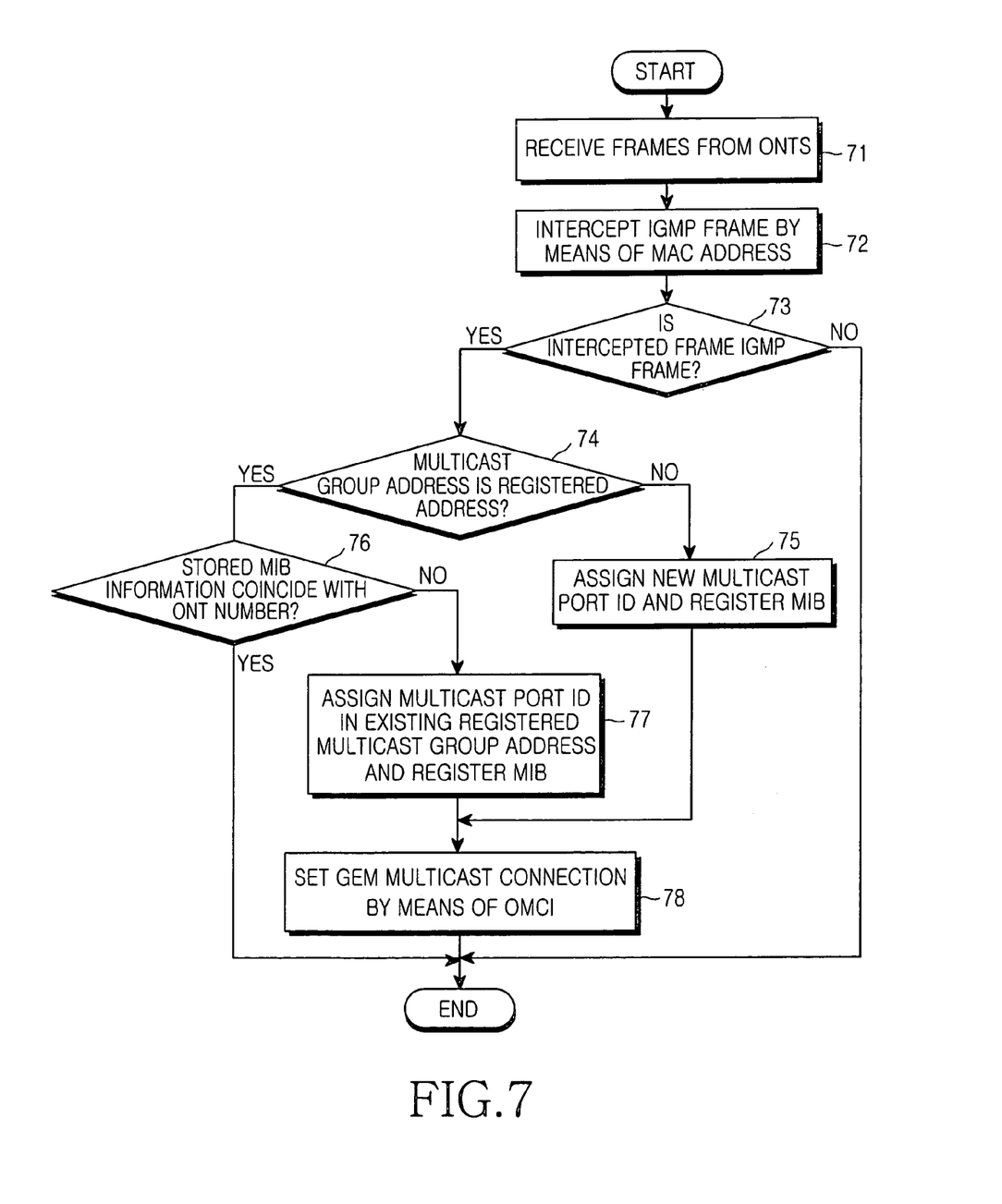
FIG. 7 is a flowchart illustrating a frame processing method for multicast transmission in an OLT of a GPON according to another aspect of the present invention.

FIG. 7 is a flowchart illustrating a frame processing method for multicast transmission in an OLT of a GPON according to another embodiment of the present invention.

Referring to FIG. 7, first, in order to construct a multicast network, hosts in a network must be registered to a router which supports a multicast. For this registration, the ONT 1 (43-1) and the ONT 2 (43-2), which are hosts, transmits an IGMP frame, which is needed to be registered to a multicast group, to the router 41.

At step 71, the OLT 42 receives frames from the ONTs 43-1 to 43-3, and at step 72 intercepts the IGMP frame through a detection using MAC addresses of the received frames. Herein, the intercepted IGMP frame is found by checking all frames, a media access control (MAC) address of which starts from "0x01005e". Herein, the value of "0x01005e" is a value the IGMP frame presented by the Ethernet standard, the GPON according to the present invention may have another address value different from the value of "0x01005e" without affecting the scope of the present invention.

At step 73, the OLT 42 confirms again whether or not the intercepted frame is the IGMP frame. From the result of the confirmation, when the intercepted frame is not the IGMP frame, a frame processing course for multicast transmission ends. In contrast, when the intercepted frame is the IGMP frame, the OLT 42 confirms at step 74 whether or not a multicast group address included in the IGMP frame is an address which has been already registered to an MIB in the OLT 42.

From the result of the confirmation in step 74, when the multicast group address is not the registered address, at step 75 the OLT 42 assigns a new multicast port ID and registers a new MIB information as shown in FIG. 5.

However, from the result of the confirmation in step 74, when the multicast group address is the registered address, at step 76 the OLT 42 confirms whether or not the stored MIB information coincides with the ONT number 52 transmitting the IGMP frame.

From the result of the confirmation in step 76, when the stored MIB information coincides with the ONT number 52, the frame processing course for the multicast transmission ends.

In contrast, at step 77, when the stored MID information does not coincide with the ONT number 52, the OLT 42 assigns the existing registered multicast port ID 53 included in the stored MIB information and registers new MIB information including a new ONT number 52.

Furthermore, at step 78, according to a registration of new MIB information similar to step 75 or step 77, the OLT 42 transmits an message, which assigns a new multicast port ID 53, to a corresponding ONT, to an OMCI and then sets a GEM multicast connection.

In the prior art, multicast frames were transmitted to hosts, which have been registered to a multicast group, though such a multicast group was not transmitted to corresponding unicast ports, after as many multicast frames as the number of the ports are copied by the OLT. However, in the present invention, the multicast frames can be transmitted only once by means of multicast port IDs assigned to multicast groups However, when the multicast frames are transmitted by means of the multicast port ID (P4) as shown in FIG. 4, a case in which an upstream signal is transmitted in response to the transmission may be problematic. Hereinafter, such a case will be described with reference to FIGS. 8 and 9.

Figure 8:
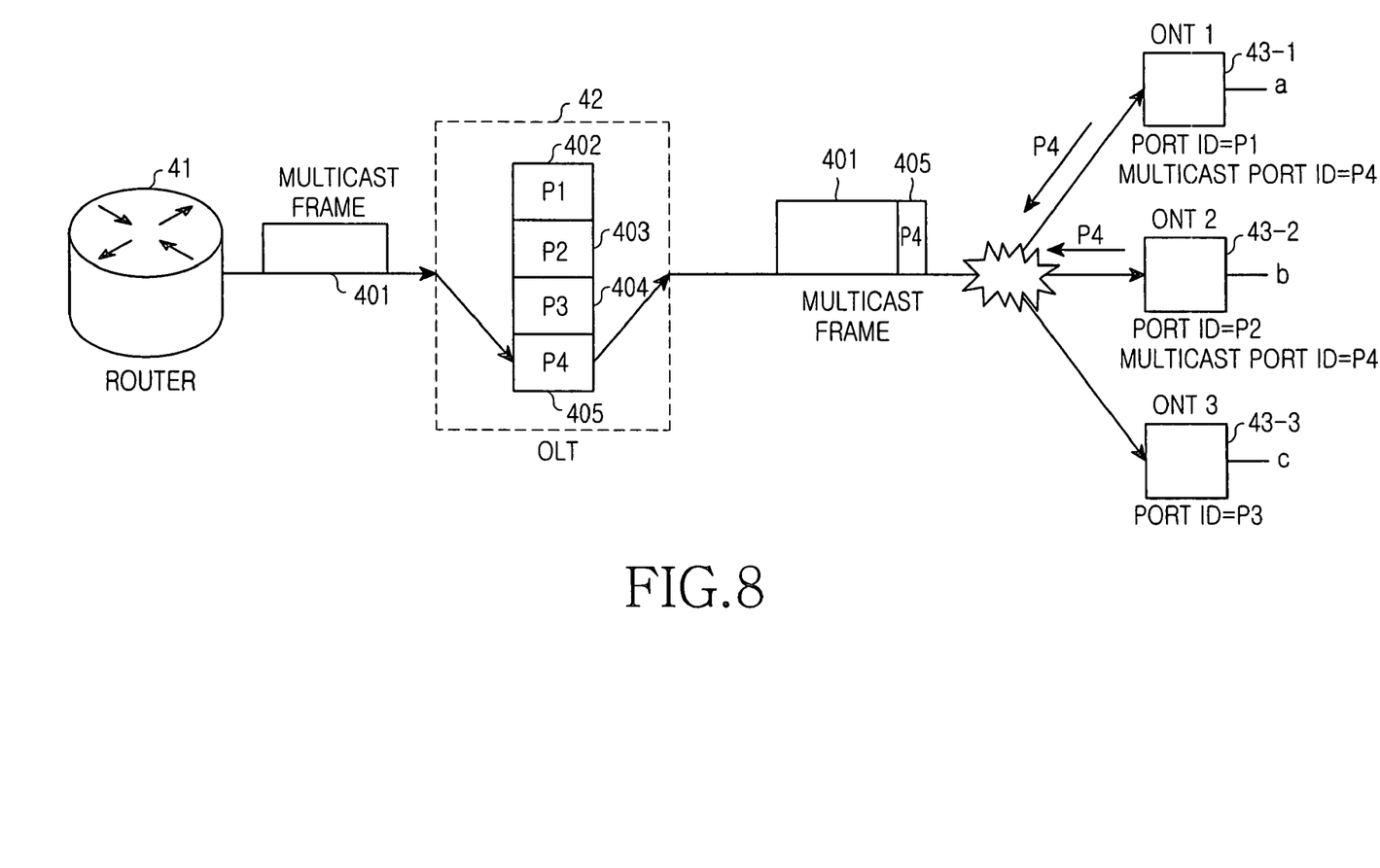
FIG. 8 is a exemplary view showing a problem of the upstream signal in performing a transmission method for the multicast frame in the GEM mode of the GPON according to the present invention.

Firstly, FIG. 8 is a exemplary view showing a problem of the upstream signal in performing a transmission method for the multicast frame in the GEM mode of the GPON according to the present invention.

As shown in FIG. 8, when each ONT responds with respect to the multicast frame transmitted through the multicast port ID (P4), the upper part cannot distinguish an ONT transmitting a corresponding upstream signal because the ONT transmits the signal upward by means of the port ID of the P4.

That is, when the ONT 1 43-1 and the ONT 2 43-2 have their port ID P1 or P2 respectively as well as the multicast port ID (P4), they communicate using their port IDs distinguishing each other, so that they can be distinguished from each other in a general unicast frame. In contrast, when they have the same multicast port ID (P4), there is a problem wherein the same port ID (P4) is used as the upstream signal.

Figure 9:
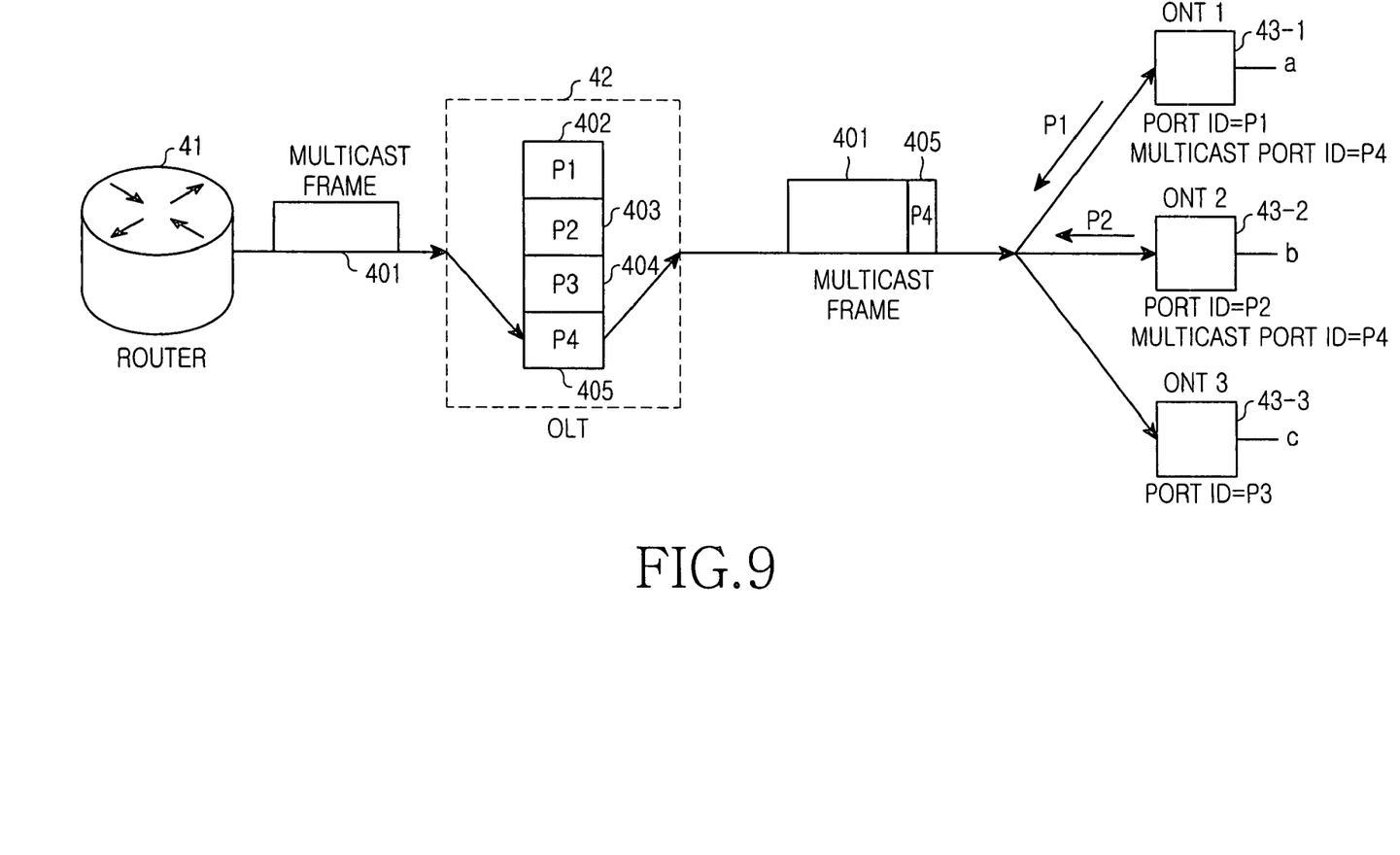
FIG. 9 is a exemplary view showing an upstream signal in performing a transmission method for the multicast frame in the GEM mode of the GPON according to the present invention.

Accordingly, in the present invention, the upstream transmission can be performed as shown in FIG. 9.

FIG. 9 is a exemplary view showing an upstream signal in performing a transmission method for the multicast frame in the GEM mode of the GPON according to the present invention.

As shown in FIG. 8, when each ONT responds with respect to the multicast frame transmitted through the multicast port ID (P4), the upper part can not distinguish an ONT transmitting a corresponding upstream signal because the ONT transmits the signal upward by means of the port ID of the P4. Accordingly, in order to solve this problem, the multicast port ID is only used for a downstream signal in the present invention.

That is, the present invention allows a response message with respect to the signal transmitted through the multicast port ID to use a port ID of each ONT, so that the problem according to the upstream signal can be solved.

Hereinafter, this will be described with reference to FIG. 9.

When the ONT 1 43-1 and the ONT 2 43-2 have their port ID P1 or P2 respectively as well as the multicast port ID (P4) and there is a transmission of the multicast frames to them, the multicast frames are transmitted by means of the multicast port ID as described above. Further, when they transmit response messages with respect to the transmission, the port IDs P1 and P2 of the ONT 1 43-1 and ONT 2 43-2 are used as upstream port IDs even though a downstream port ID is the multicast port ID (P4).

The present invention proposes a method capable of supporting a multicast in a GEM mode in a GPON, thereby solving the problem of the prior art in that as many multicast frames as the number of related ports must be copied in transmitting the multicast frames. Therefore, the present invention enables multicast frames to be efficiently transmitted, thereby increasing bandwidth.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of processing frame by an optical line termination (OLT) for multicast transmission in a Gigabit-capable passive optical network encapsulation mode (GEM) mode in a Gigabit-capable passive optical network, the method comprising the steps of:

a) an OLT receiving a frame from an optical network unit (ONT), which belongs to the OLT, and intercepting an Internet Group Management Protocol (IGMP) frame by means of a media access control (MAC) address of the received frame;

b) confirming whether an address of a multicast group, which is included in the IGMP frame, is an address registered to the OLT;

c) confirming whether an ONT number coincides with an ONT number registered to the OLT, as a result of the confirmation in step b, when the address of the multicast group is the address registered to the OLT;

d) assigning a new multicast port ID to the address of the multicast group, and registering corresponding information to the OLT, as a result of the confirmation in step b, when the address of the multicast group is not the address registered to the OLT;

e) assigning a multicast port ID, which has been registered to the address of the multicast group, to the ONT, and registering corresponding information to the OLT, as a result of the confirmation in step c), when the ONT number does not coincide with an ONT number registered to the OLT; and f) transmitting a message to the ONT, the message requiring the multicast port ID having been registered to be assigned to the ONT.

2. The method as claimed in claim 1, further comprising a step g) of ending the method of processing frames by the OLT when the ONT number coincides with the ONT number registered to the OLT.

3. The method as claimed in claim 1, wherein the information registered to the OLT includes a multicast group address which enables multicast groups to be differentiated, an ONT number representing an ONT registered to a multicast group, and a multicast port ID assigned to the multi cast group.

4. The method as claimed in claim 1, wherein an ONT management control interface (OMCI) message is used as the message having contents which assigns the multicast port ID in step f).

5. The method as claimed in claim 3, wherein the multicast port ID is used for a downstream signal from the OLT to the ONT, and a response for the multicast port ID uses a port ID originally assigned to the ONT.

* * * * *